United States Patent [19]

Feldman

[11] Patent Number: 4,596,051
[45] Date of Patent: Jun. 17, 1986

[54] OPTICAL INTERFACE TO AN ELECTRICAL CENTRAL OFFICE

[76] Inventor: Nathan W. Feldman, 910 Van Court Ave., Long Branch, N.J. 07740

[21] Appl. No.: 527,054

[22] Filed: Aug. 29, 1983

[51] Int. Cl.⁴ .............................................. H04B 9/00
[52] U.S. Cl. .................................. 455/614; 455/612
[58] Field of Search ............... 455/606, 607, 610, 612, 455/614; 179/170 NC, 113, 18 FA

[56] References Cited

U.S. PATENT DOCUMENTS 4,002,897 1/1977 Kleinman et al. ................. 455/612
4,284,858 8/1981 Nicholson ........................ 455/614

OTHER PUBLICATIONS

Feldman—An All Optical Telephone Set–Conf. 1981, Intern. Conf. on Comm. Denver Co., Jun. 14–18, 1981, pp. 31.5.1–31.5.4.

*Primary Examiner*—Joseph A. Orsino, Jr.
*Attorney, Agent, or Firm*—Anthony T. Lane; Jeremiah G. Murray; Maurice W. Ryan

[57] ABSTRACT

An electro-optical interface unit is shown for interfacing an all-optical telephone to a conventional electrical-metallic-type telephone communications system, having conventional electrical subscriber units, switching, and supervisory systems. An overall all-optical telephone communication system, of which an all-optical telephone is a part, is envisioned. The disclosed system makes use of optical-acoustic-electrical types of transducer elements, light modulators, and optical junctions, among other novel elements.

7 Claims, 10 Drawing Figures

PRIOR ART

OPTICAL INTERFACE TO AN ELECTRICAL CENTRAL OFFICE

The invention described herein may be manufactured, used and licensed by or for the Government for Governmental purposes without the payment to me of any royalties thereon.

BACKGROUND AND FIELD OF THE INVENTION

This invention relates generally to the field of telephone systems and specifically to optical telephones.

With the advent of the all-optical telephone apparatus, it will become necessary to provide some sort of interface device for enabling' a conventional telephone user system to accommodate the new optical-type instead of the conventional electrical-type telephone devices. A conventional electrical central office which routinely sends/receives such messages as transmit, off-hook detection, ring sending and supervision, and accomplishes complicated switching and connection functions, must be somehow made compatible to the new optical phone. While it is anticipated that eventually overall telephone systems will themselves become all optical thus requiring no interface for the new optical phone, such overall system is not yet known to exist. Clearly, therefore, a device capable of interfacing between the optical telephone and a conventional telephone system would be highly desirable.

BRIEF DESCRIPTION OF THE INVENTION

The configuration for one embodiment of an interface unit includes block elements that will accommodate the translation of individual functions between one (optical) domain and the other (electrical-metallic) domain. At the optical input port, are optical fibers which are fed to the optical to electrical transducer elements, to be described herein. Following this step, the resulting electrical signals are fed to electronic amplifier units. The analog electrical signals, representative of the modulated light input signals, are next useable in ring sender, off-hook detector, ring frequency generator, closure generator, and ring detector electrical units, e.g.; a hybrid device, light generator, and optical modulator are among the included devices that perform the inverse function, converting from analog electrical into modulated light signals, for later transmission over the optical fiber lines. Also included are optical junction devices which serve to join together light from several optical fiber lines in a summation like process.

OBJECTS OF THE INVENTION

Accordingly, it is one object of this invention to provide an interface device for rendering compatible an all optical telephone with a conventional electrical telephone communications network.

Another object of this invention is to provide apparatus for conversion between light, acoustical, and/or electrical-type energy.

A still further object of this invention is to provide additional telephone communicative functions to a present optical telephone unit, in a separate add-on companion unit while providing an interface of the optical telephone to overall conventional telephone systems now in existence.

Other objects and advantages of this invention will become readily apparent to those skilled in the art from a reading of the within specification and accompanying drawings, in which:

LIST OF FIGURES

DETAILED DESCRIPTION OF THE INVENTION

Figure 1:
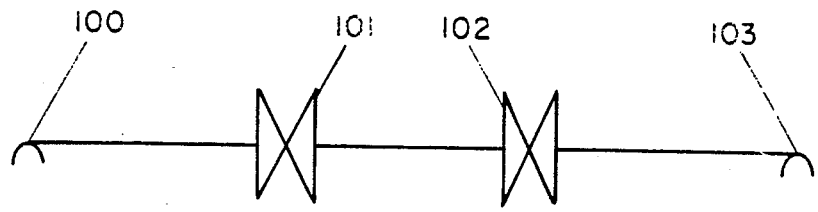
FIG. 1 illustrates in symbolic form, a prior art conventional electrical-type telephone system.
Figure 2:
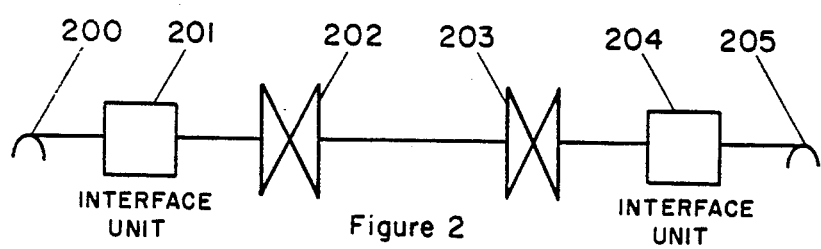
FIG. 2 illustrates an electro-optical type telephone system having modifications to the system shown in FIG. 1.

FIG. 1 illustrates a conventional telephone communications network. Potential users of the system represented by subscribers 100, 103 communicate over a conventional metal wire or loop. Conventional metal switches 101, 102 represent symbolically all the complicated switching, possibly computer controlled, that is undergone in a conventional system hookup of stations. In FIG. 2, an electro-optical telephone network is shown instead. Of note is the addition of interface units 205, 201, 204 and 205 which act as transducers between optical, electrical, and/or acoustical type energy as the case may be. In this electro-optical type telephone system, the wires are optical lines, such as fiber optics. The many advantages of fiber optics versus metal loops should be apparent; some are described in a related, now abandoned, patent application, Ser. No. 385,640 of Messrs. Nathan W. Feldman, Harold A. Bock, Jr. and Salvatore A. Romano, Jr., entitled "Optical Telephone Apparatus", the entire file of which, including publications therein, is incorporated herein by reference and made a part hereof as though fully set forth in all detail. Reference is also made to the following publicly available printed publications which are likewise incorporated herein by reference and made a part hereof as though fully set forth: Gerd Reiser and Ray Taylor, Optical Switching in Tomorrow's Network: Optical Specta, December, 1981; Chang, K. Y., Fiberquide Systems in the Subscriber Loop: Proceedings of the IEEE, Vol. 68, No. 10, October, 1980; Berkowitz, Herbert, Fiber Optics for the Short Haul: Optical Spectra, November, 1981; Dakss, M. L., Optical Switching for Multimode Fibers Links: Presented at a Symposium Feb. 26, 1980; and Belin, A. M., Ryabokon V. N., Svidzinskii, K. K., Integrated-Optical Switching System, Sov. J. Quantum Electron 10(21), February, 1980.

Figure 3:
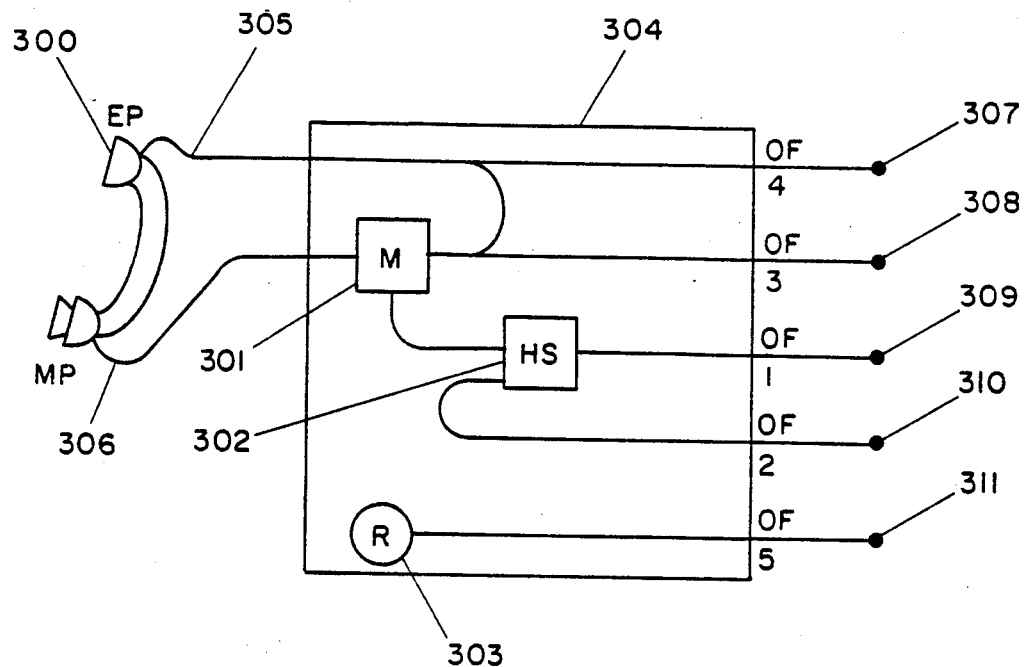
FIG. 3 is a block diagram of one possible embodiment of an all-optical telephone device to be interfaced.

FIG. 3 illustrates a five-fiber, all optical, telephone device. To be noted, this telephone has no electrical power sources available to it; the ac or dc power sources are reserved for inclusion within the interface unit embodiments, shown throughout the Figures. In this arrangement, block 301 labeled M is a modulator means, block 302 labeled HS is a hook switch, and block 303 labeled R is a ringer means while designations EP and MP on telephone 300 represent earphone and microphone respectively. These elements are discussed further elsewhere and particularly in the file of case Ser. No. 385,640, cited earlier. It is stressed that all components described throughout this specification are currently realizable, feasible, and in some cases already commercially available.

Figure 4:
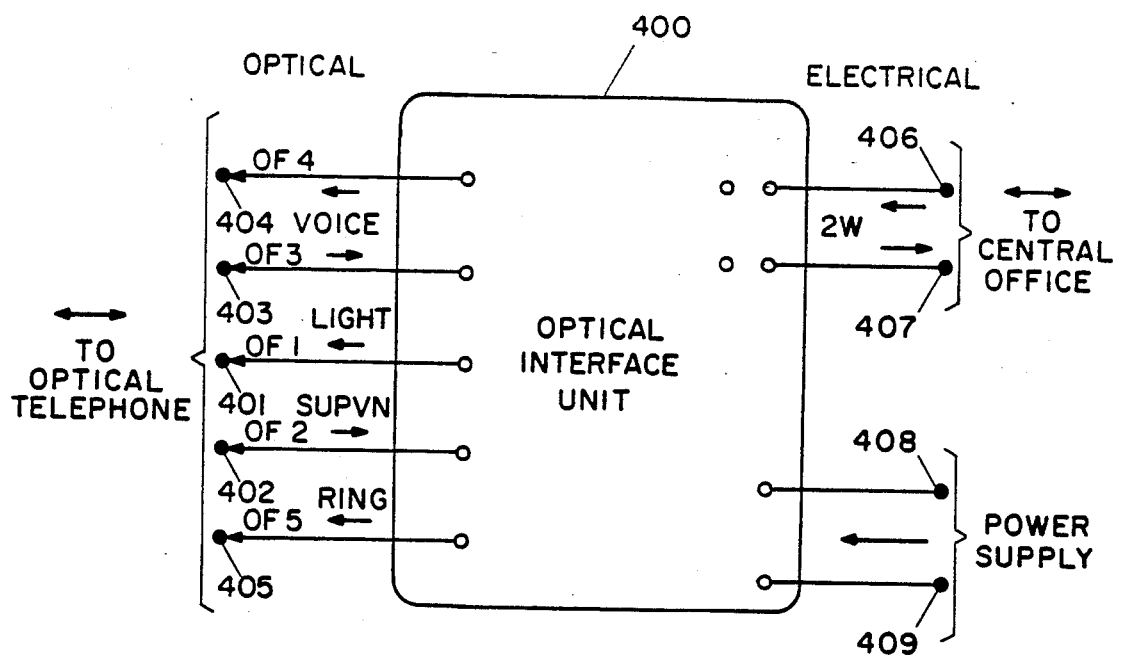
FIG. 4 is a symbolic representation of a useable electro/optical interface unit between a conventional central office and an optical telephone similar to that of FIG. 3.
Figure 5:
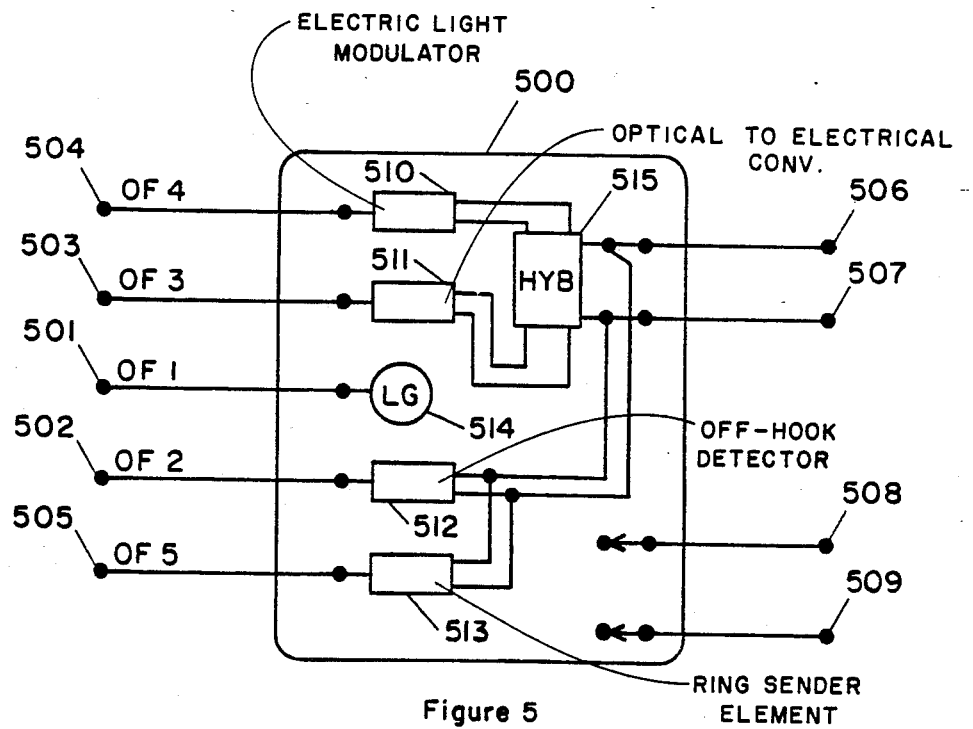
FIG. 5 illustrates one possible embodiment of the internal structure of an interface unit such as in FIG. 4, for a 2-line convention.
Figure 6:
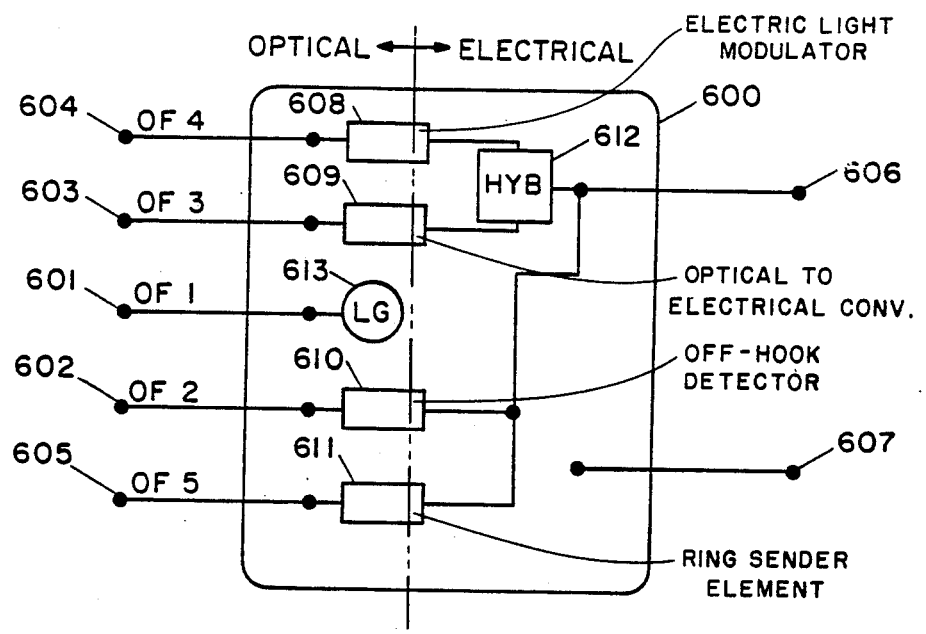
FIG. 6 illustrates another possible embodiment of the internal structure of an interface unit such as in FIG. 4, this for a single-line convention.

In FIG. 4, an interface unit is shown which will allow interface between an otherwise incompatible central office type system, and optical telephone type devices. The interface units of this invention are intended to address the telephone functions of talking, listening, ringing, supervision and associated logic. The interface will convert the optical traffic, ringing, supervision and logic to their equivalents in the electrical domain and vice versa. "Common battery" mode of supervision will be applied to this treatment. While the optical telephone has the characteristics that transmission mode is 4-wire equivalent, supervision toward the central office is steady-state "on" or "off" light, ringing from the central office is 20 Hz (or any more acceptable frequency) modulated light, and traffic is analog modulated light, the central office however, has subscriber terminations with characteristics such that transmission mode is 2-wire, incoming supervision is electrical C B, subscriber signaling is electrical 20 Hz, and traffic is electrical analog. On the optical side of the interface to be noted, will be O.F. 1 through O.F. 5, the optical fibers, (lines 401-405), and on the electrical side will be one metallic lines 406, 407. The 2 W termination of FIG. 4 shows how interfacing can be achieved with the 5-fiber optical telephone. The contents of the interface unit for the 2-line convention is illustrated in FIG. 5, and for the single line convention, in FIG. 6. In FIG. 5, symbolic elements 510-513, which are described elsewhere in the specification, comprise respectively an electrical light modulator, an optical to electrical converter, an off hook detector, and a ring sender element, while element 514 illustrates a light generator and element 515, a hybrid circuit, all to be described elsewhere in this specification, elements considered known in the prior art being labeled in addition to numerically designated. FIG. 6 has similar elements 608-611 being symbolic of the electric light modulator, the optical to electrical converter, the off hook detector, and the ring sender elements, those elements considered being known to exist in the prior art being labeled in addition to numerically designated. A good approach to interfacing seen in the embodiments in this specification is to separate from the 2 wires (one pair) from the central office, the various operating functions. The traffic can be extracted by means of a "hybrid" circuit and immediately can be converted to 4-wire. The 20 Hz ring signal can be extracted by bridging an appropriate low pass filter. The required dc closure, needed for common battery supervision, can be bridged onto the sole pair using proper isolating components. The functions are next converted individually to the optical domain.

Figure 7:
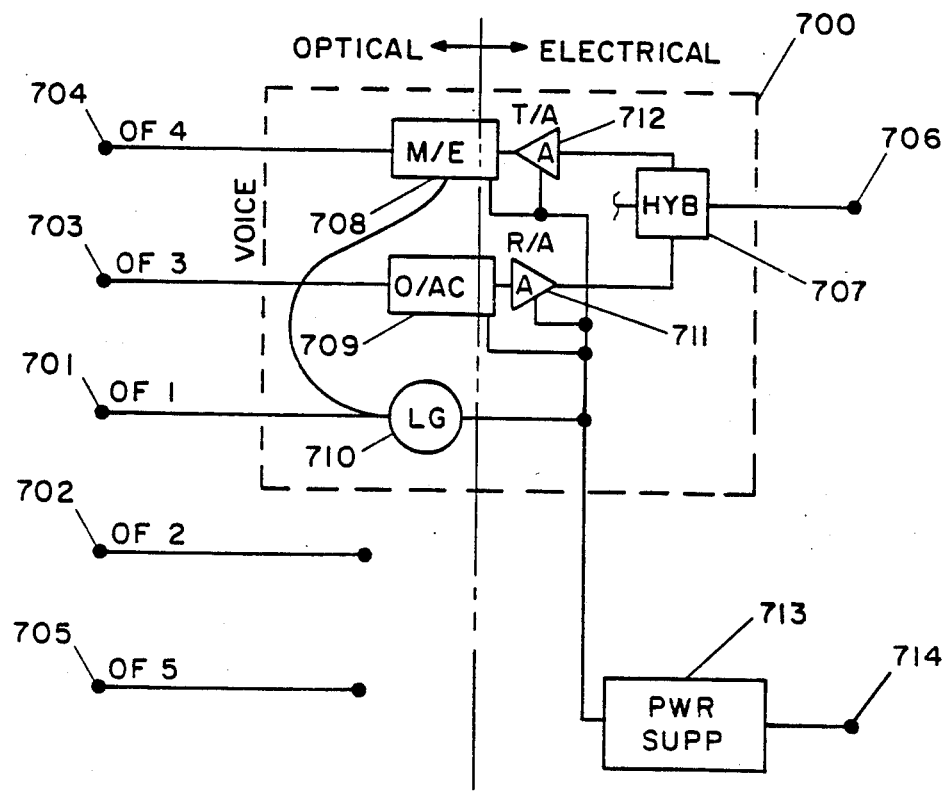
FIG. 7 illustrates another possible embodiment of the electro/optical interface unit, this for a traffic pair converted to a 4-wire, equivalent.

FIG. 7 illustrates an embodiment of an interface unit which addresses opto/electric conversion of the telephone "traffic" function. Here the traffic pair must be first converted to 4-wire equivalent (the two directions of transmission must be separated) using a traditional hybrid circuit (HYB), 707. The receive traffic must be converted from modulated light to analog electrical. For this, opto-electrical converter (OA/C) 709 is needed with an appropriate electronic amplifier (R/A) 711. The transmit traffic must be converted from analog electrical to modulated light. This will require an appropriate electronic amplifier (T/A) 712 to provide adequate electrical signals to an electro-optical modulator (M/E) 708. The resulting signal will exhibit amplitude modulation of the carrier which in this case is the optical energy provided by the light generator (LG) 710. The Hybrid circuit, (HYB), 707 is a readily available component in the telephone industry. It may be either electrical or electronic. The opto-to-electrical converter, (0/AC), 709, converts received amplitude modulated light into analog electrical energy; such devices are commercially available. The amplifiers (A), 711, 712, comprise a normal voice frequency analog amplifier whose function is to match the output level of one medium to the input level required by another medium. Once the needed impedance and gain is established, the amplifier's design is easily achieved. The optical modulator (M/E) 708 converts voice frequency analog electrical energy into amplitude modulated optical energy. Many techniques are already known in the field for accomplishing this function. The light generator, (LG) 710, converts electrical energy into light of proper amplitude, quality and wavelength. This component is commercially available in many forms and qualities. The final design of the telephone/interface system controls the final selection of a suitable LG.

Figure 8:
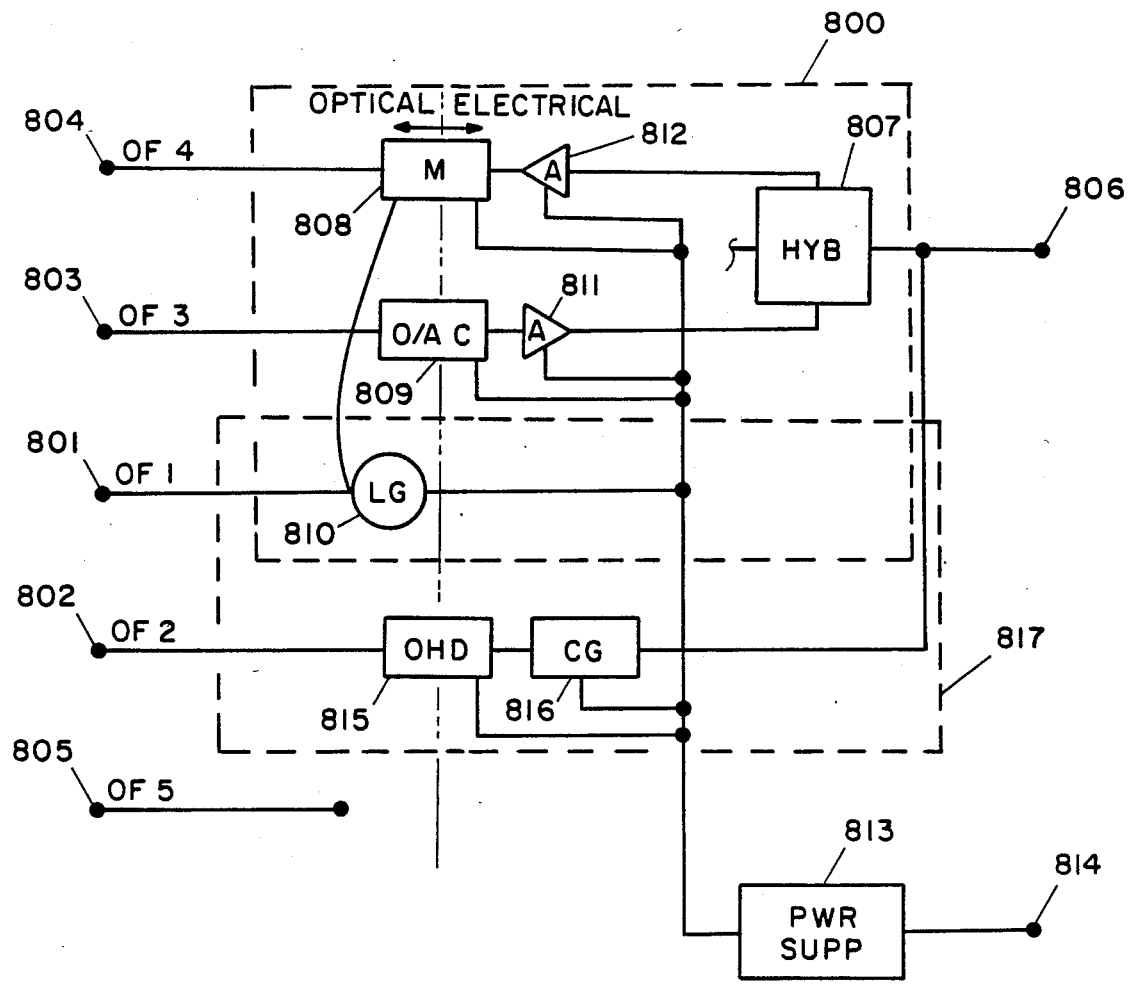
FIG. 8 illustrates a further advanced interface unit additionally having a supervisory system included, beyond that available in FIG. 7.

In FIG. 8, the supervisory system 817 is added to the system shown in FIG. 7. Its operation requires that a dc closure be applied to the metallic pair coming from the central office when the telephone goes off-hook. An off-hook detector (OHD) 815, which will respond to either a light-on or a light-off signal from the optical telephone, is connected to a closure generator (CG) 816. Whichever signal signifies the off-hook condition will cause the (CG) to apply a dc closure to the subscriber pair coming from the central office. The off-hook detector (OHD), 815 is a device which can recognize the presence of optical energy arriving on the optical fiber from the optical telephone and cause the closure generator to apply a dc closure on the traffic pair from the central office. Closure Generator (CG) 816 is a device which can provide a dc closure on the 2-wire line while bridging the analog traffic. It is actuated by the electrical stimulus of the off-hook detector and may be comprised of an electromagnetic relay and an adequate inductor, for instance.

Figure 9:
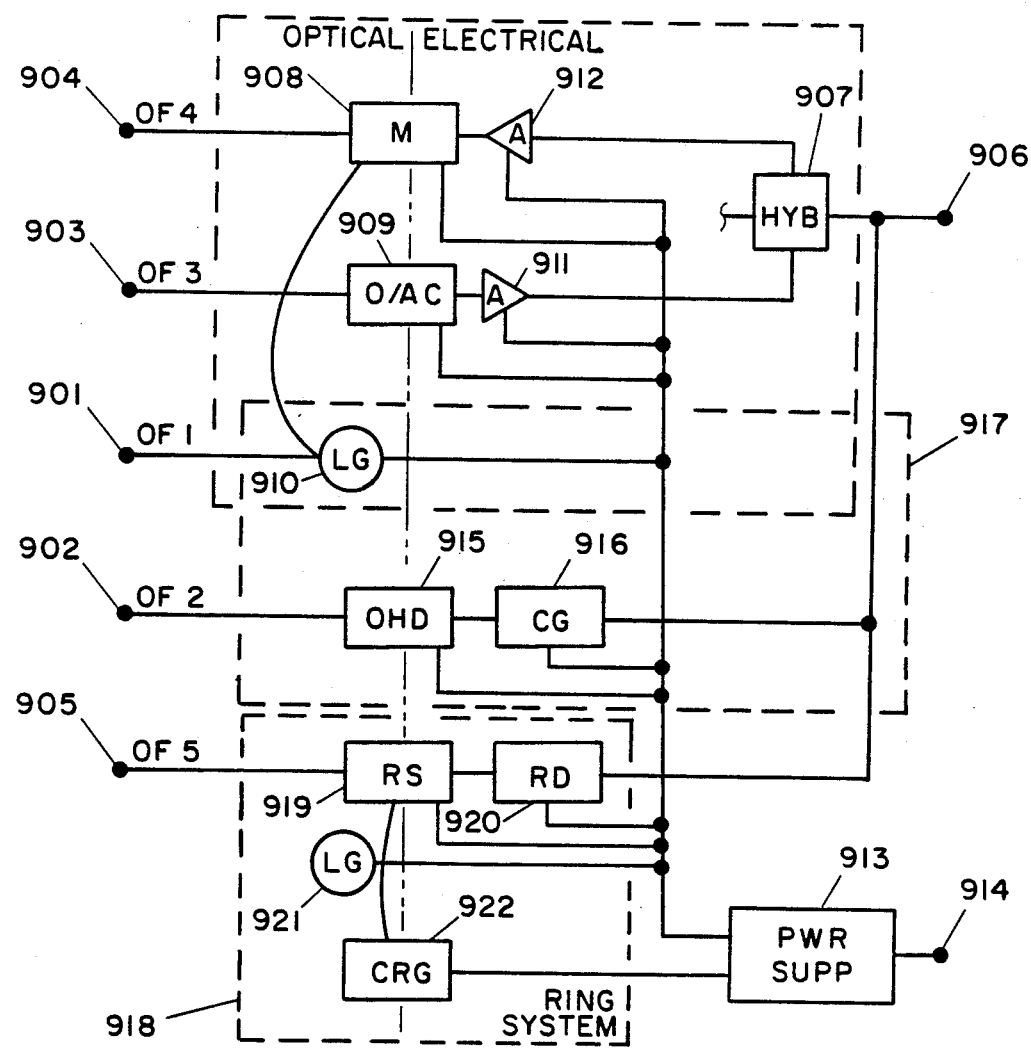
FIG. 9 represents a still further advanced interface unit including additionally a ring (or signaling) system added to the system already shown in FIG. 8.
Figure 10:
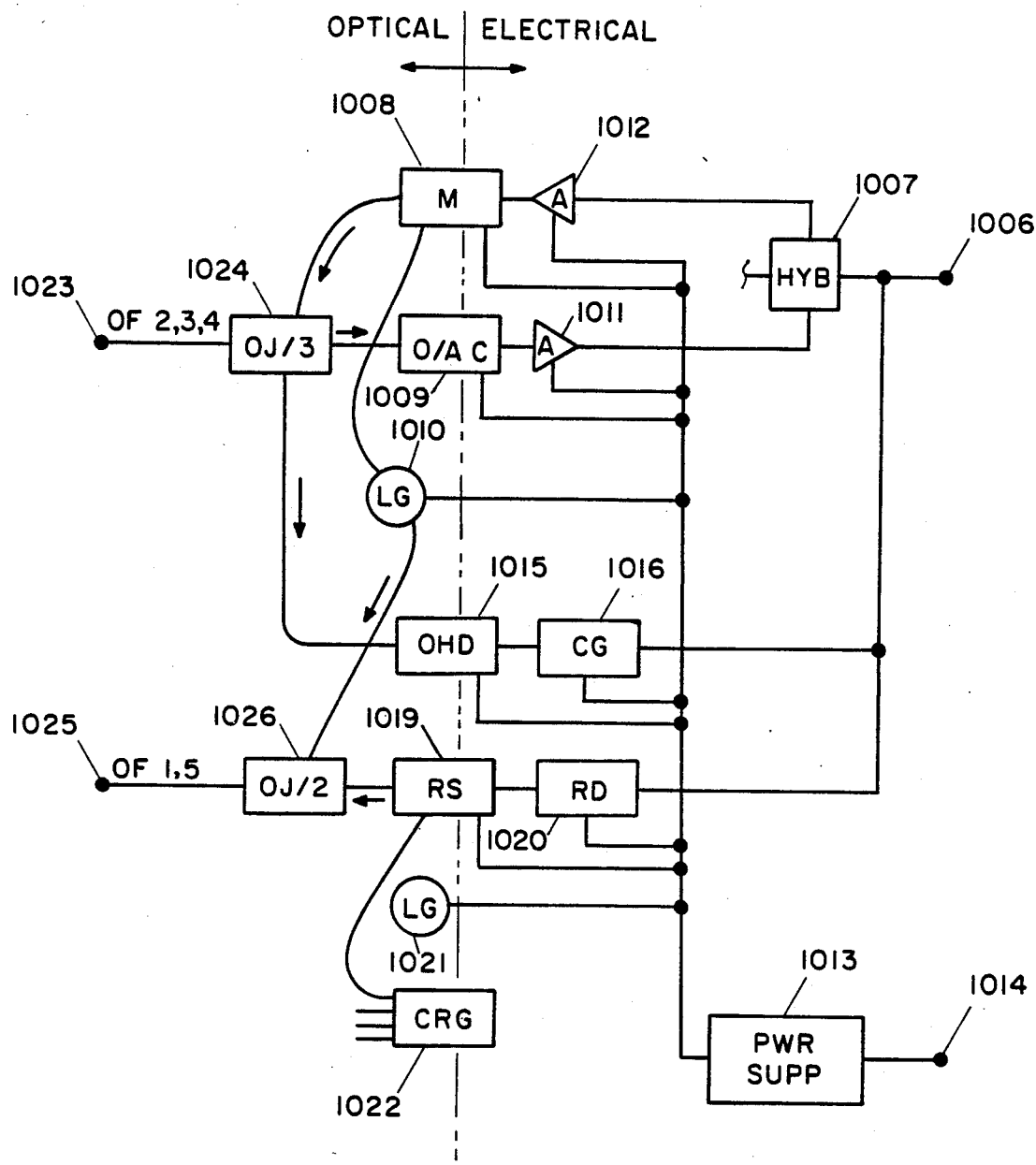
FIG. 10 represents a yet further advancement, with interface unit additionally including means for accomodating an optical line with only 2 fibers, instead of a 5 fiber line.

In FIG. 9, the signaling or ring system 918 is added to the system shown in FIG. 8. The central office output electrical 20 Hz signal has been extracted and is to be converted to relatively high level light, modulated at an optimum ringing frequency (ORF). The system for achieving this comprises a ring frequency generator (CRG), 922, with probably one such unit shared by several interface circuits; a light generator (LG) 921 to service the CRG; a ring sender (RS) 919 to apply the optical ring signal to the ring fiber 905; and a ring detector (RD) 920 to switch on the RS 919 when an electrical ring signal is received from the central office. The common ring generator, (CRG) 922 is a device which can provide a source of light that has been modulated by the ringing frequency. It is suggested that one such generator might supply more than one interface system. Its output should be relatively high level; its usage is believed to be infrequent. The ring detector (RD) 920 is a frequency selective device that responds only to the central office ring signal. On receipt of such signal it generates the electrical energy needed to activate the ring sender 919. The three functional systems serving the subscriber metallic pair from the central office 800, 917, 918, e.g., are now realizable. In FIG. 9 they are shown together in one device connected to a five-fiber optical telephone. This may be visualized as full implementation of an optical/metallic subscriber system, in system block diagram outline form. In a two-fiber optical telephone, to be noted, both directions of traffic and the supervisory information would use one fiber and the dc optical power and the ring signal would use the other fiber. A few modifications of FIG. 9 would be needed in order to accommodate a two-fiber only type system. Such modified system is diagrammed in FIG. 10 and it could reduce the needed fiber optic cable from five strands down to only two.

It is instructive to follow the paths of signals on the optical lines emanating from upper fibers (OF 2,3,4), shown partly by arrows there. The uppermost line carries traffic from the electrical side toward the optical side. The middle line brings traffic from the optical side to the electrical side. The junction of these two lines can be considered an optical/hybrid. The lowermost line carries supervisory information from the optical telephone hookswitch to the off-hook detector. Presence of light here would indicate the off-hook condition which the OHD would detect. The junction of this line with the incoming fiber (0.F. 2,3,4) is a simple bridge with minimal directional characteristics needed.

The arrows on the lines emanating from the lower fiber (OF 1,5) each point towards the optical instrument, which is connected presumbly at point 1025. One of these lines carries dc light continuously and the other, the ring signal from (RS), only when appropriate. When the telephone is taken off-hook, the hookswitch should direct the optical energy arriving via its optical fiber (OF 1,5) to the modulator (M) 1008, instead of to the ringer system. Sufficient optical energy is sent back toward the central office to actuate the off-hook detector (OHD) 1015. The central office is thus given the proper supervisory information.

The optical junction, 3 port, (OJ/2) 1026, is a device which combines with minimum attenuation, the optical energy coming from the ring sender 1019 and the light generator 1021 onto one fiber, (OF 1,5), presumably going to the optical telephone.

The optical junction, 4 port, (OJ/3), 1024 is a device which combines three fibers from the interface circuitry into one fiber, (OF 2,3,4) energy, presumably going to the optical telephone. The optical signal coming from the telephone would be transferred to the traffic receive system and its off-hook detector with minimum attenuation, but the optical signal from the traffic transmit system would be selectively fed onto the telephone fiber (OF 1,5) and attenuated as transmitted towards the other parts. Further simplifications are of course feasible without changing the overall realization of the interface device. One simplification among many may be that of combining the two light generators 1010, 1021 into one common light generator. The advent of high power light generators makes this a workable and perhaps cost effective change.

While the invention may have been described with respect to a particular embodiment or embodiments, the invention also includes all possible substitutions, modifications and equivalents within the full scope of the invention and claims; such will be readily appreciated by one skilled in the art.

What is claimed is:

1. An optical to electrical, telephone system interface device comprising:

light port means for transceiving light upon light conductive lines said lines being connected to an optical telephone device for transceiving light therebetween;

electrical port means for transceiving first electrical signals upon electrically conductive lines, said, lines being connected to an electrical central office system;

transducing means connected to both said port means for transducing between light energy and electrical analog signal energy, or vice versa; and electrical control means interposed between said electrical port means and said transducing means for conversion of signals transceived therebetween.

2. The interface device of claim 1 wherein said electrical control means comprises means for performing telephone supervisory functions.

3. The interface device of claim 2 wherein said electrical control means comprises means for performing telephone traffic functions of off hook detection and ringing.

4. The interface device of claim 3 including means for respectively performing telephone talking and listening functions.

5. The interface device of claim 1 wherein said electrical control means comprises means for performing telephone ringing functions.

6. The interface device of claim 1 wherein said electrical control means comprises means for performing telephone off hook detector functions.

7. An optical/electrical telephone system comprising, in combination:

at least one subscriber optical telephone device;

a telephone central office switching system;

an interface device for rendering compatibility between said central office switching system and said subscriber optical telephone device;

and, comprised in said interface device, light port means for transceiving light upon light conductive lines, asaid lines being connected to said optical telephone device for transceiving light therebetween;

electrical port means for transceiving first electrical signals upon electrically conductive lines, said lines being connected to said central office system;

transducing means connected to said light port means for transducing between light energy and electrical analog signal energy, or vice versa; and electrical control means interposed between said electrical port means and said transducing means for conversion of signals transceived therebetween.

* * * * *